US010673343B1

(12) United States Patent
Tong et al.

(10) Patent No.: US 10,673,343 B1
(45) Date of Patent: Jun. 2, 2020

(54) DIODE CLAMP MIXED THREE-LEVEL DUAL ACTIVE FULL-BRIDGE CONVERTER AND CONTROL METHOD THEREOF

(71) Applicant: Shanghai Jiao Tong University, Shanghai (CN)

(72) Inventors: Anping Tong, Shanghai (CN); Guojie Li, Shanghai (CN); Lijun Hang, Shanghai (CN); Keyou Wang, Shanghai (CN)

(73) Assignee: Shanhai Jiao Tong University, Shanghai (CN)

( * ) Notice: Subject to any disclaimer, the term of this patent is extended or adjusted under 35 U.S.C. 154(b) by 0 days.

(21) Appl. No.: 16/512,304

(22) Filed: Jul. 15, 2019

(30) Foreign Application Priority Data

Jan. 31, 2019 (CN) .......................... 2019 1 0097721

(51) Int. Cl.
*H02M 3/335* (2006.01)
*H02M 1/00* (2006.01)
(52) U.S. Cl.
CPC ......... *H02M 3/33584* (2013.01); *H02M 1/00* (2013.01); *H02M 2001/0048* (2013.01)
(58) Field of Classification Search
CPC ............... H02M 3/33584; H02M 1/00; H02M 2001/0048; H02M 7/487; H02M 7/5387
USPC ......... 363/16–17, 37, 41, 65–69, 71, 95, 97, 363/127, 131, 132
See application file for complete search history.

(56) References Cited

U.S. PATENT DOCUMENTS

| 2011/0249472 | A1* | 10/2011 | Jain | H02M 3/33584 363/15 |
| 2013/0154716 | A1* | 6/2013 | Degener | H02M 7/487 327/424 |
| 2013/0272045 | A1* | 10/2013 | Soeiro | H02M 7/537 363/131 |
| 2014/0254228 | A1* | 9/2014 | Ying | H02M 7/5387 363/132 |
| 2015/0236603 | A1* | 8/2015 | Jimichi | H02M 5/293 363/37 |

* cited by examiner

*Primary Examiner* — Rajnikant B Patel
(74) *Attorney, Agent, or Firm* — Mei & Mark LLP; Manni Li

(57) ABSTRACT

A diode clamp mixed three-level dual-active full-bridge converter based on a dual active full-bridge converter, an additional control variable is added by replacing two-level bridge arm on the primary side with a diode clamp three-level bridge arm. A control method based on four variables including duty ratios of 0 voltage level and high voltage level of the primary side, duty ratio of 0 voltage level of the secondary side of the diode clamp mixed three-level dual active full-bridge converter, and phase shift ratio between primary and secondary sides of the diode clamp mixed three-level DAB converter; four-degree-of-freedom globally optimized control is realized by coordinating four variables, RMS value of the current is reduced, and operating efficiency of the converter is improved. Closed-loop control of the DAB globally optimized operation is given, which enables the converter to automatically realize globally optimized operation under different operating conditions.

10 Claims, 6 Drawing Sheets

US 10,673,343 B1

DIODE CLAMP MIXED THREE-LEVEL DUAL ACTIVE FULL-BRIDGE CONVERTER AND CONTROL METHOD THEREOF

CROSS-REFERENCE TO RELATED APPLICATION

The subject application claims priority on Chinese patent application no. CN 201910097721.1 filed on Jan. 31, 2019 in China. The contents and subject matter of the Chinese priority application is incorporated herein by reference.

FIELD OF TECHNOLOGY

The present invention relates to direct current/direct current (DC/DC) high-frequency isolated conversion, particularly, a diode clamp mixed three-level dual active full-bridge converter suitable for wide voltage range and a control method for reducing the loss thereof.

BACKGROUND ART

The dual-active full-bridge converter based on phase-shifting control technology (Dual Active Bridge-Isolated Bidirectional DC/DC Converter, DAB) has the advantages of high-power density, fast dynamic response, easy to realize soft switching, and bidirectional flow of power, etc. It is widely welcomed in the fields of uninterruptible power supply, electric vehicles, and solid-state transformers. The common DAB converter control method is phase shifting control, which generates a two-level or multi-level voltage square wave with relative phase shift at the primary side port and the secondary side port of the high-frequency transformer, at the same time, the relative phase shift of the square wave at the primary and secondary sides and the duty ratio of each level are adjusted to regulate the power flow through the converter and control the waveform of the current flow through the high-frequency transformer. In the traditional two-level DAB converter, commonly used modulation methods are single phase shift modulation (SPSM), dual phase shift modulation (DPSM), extended phase shift modulation (EPSM), and triple phase shift modulation (TPSM). Among the methods, TPSM has three independent control variables and is the most flexible modulation mode in the two-level DAB converter. However, when the port voltage of the converter changes within a large range, such as power battery voltage of the vehicle can sometimes vary from 200V to 450V, in such applications, even with the optimized TPSM modulation technology, the two-level DAB converter still has large current stress and current root mean square (RMS) value in some working areas, low energy transmission efficiency, and its comprehensive performance still needs to be further improved.

To adapt the converter to a wider range of port voltage, the diode clamp mixed three-level DAB converter can be added with an intermediate level with controllable duty ratio and obtain an additional independent control variable, which breaks the design limit of the traditional two-level DAB converter, improves the conversion efficiency of the input and output power over the entire voltage range and power range, and achieves global optimal operation. However, how to determine the duty ratio of different levels and how to coordinate the four independent control variables to reduce the current stress and the current root mean square (RMS) value of the isolated transformer in the converter is an urgent problem to be solved in the topology construction and control method of the diode clamp mixed three-level DAB converter.

At present, there is no description or report of similar technology to the present invention, and no similar data at home and abroad have been collected.

SUMMARY OF THE INVENTION

In view of the above-mentioned deficiencies in the existing technology, the object of the present invention is to provide a diode clamp mixed three-level dual active full-bridge (DAB) converter and a four-degree-of-freedom global optimal control method thereof with a topology structure that can adapt to the working condition under which the port voltage changes within a wide range. The control method can effectively reduce the current RMS and current stress of the isolated transformer in the converter, automatically realize global optimal operation, and improve operating performance of the DAB.

The present invention is realized through the following technical scheme:

The present invention provides a diode clamp mixed three-level dual active full-bridge converter comprising input filter capacitors $C_{inp}$ and $C_{inn}$, an output filter capacitor $C_o$, a DC voltage source, a primary side diode clamp mixed three-level full-bridge $H_1$, a secondary side single-phase full-bridge $H_2$, a high-frequency isolation transformer, a high-frequency inductor $L_s$, and a controller;

the primary side diode clamp mixed three-level full-bridge $H_1$ comprises fully controlled switching devices $S_1$~$S_6$ and diodes $D_1$ and $D_2$; the fully controlled switching devices $S_1$~$S_4$ and diode $D_1$ and $D_2$ form a diode clamp three-level bridge arm, and the fully controlled switching devices $S_5$ and $S_6$ form a two-level bridge arm;

the secondary side single-phase full-bridge $H_2$ comprises fully controlled switching devices $Q_1$~$Q_4$;

the anodes of DC bus of the primary side diode clamp mixed three-level full-bridge $H_1$ are respectively connected with the anode of the corresponding DC voltage source and the anode of the input filter capacitors $C_{inp}$, the cathodes of DC bus of the primary side diode clamp mixed three-level full-bridge $H_1$ are respectively connected with the cathode of the corresponding DC voltage source and the cathode of the input filter capacitors $C_{inn}$, the neutral point of the diode of the primary side diode clamp mixed three-level full-bridge $H_1$ is connected with the midpoint of the series circuit between input filter capacitors $C_{inp}$ and $C_{inn}$. the AC side of the primary side diode clamp mixed three-level full-bridge $H_1$ is connected with the primary side of the high-frequency isolation transformer through the high-frequency inductor $L_s$;

the anodes of DC bus of the secondary side single-phase full-bridge $H_2$ are respectively connected with the anode of the corresponding DC load and the anode of the output filter capacitor $C_o$, the cathodes of DC bus of the secondary side single-phase full-bridge $H_2$ are respectively connected with the cathode of the corresponding DC load and the cathode of the output filter capacitor $C_o$, the AC side of the secondary side single-phase full-bridge $H_2$ is connected with the primary side of the high-frequency isolation transformer; and the input of the control signal of the fully controlled switching devices $S_1$~$S_6$ and the input of the control signal of the fully controlled switching device $Q_1$~$Q_4$ are respectively connected with the output of the switching signal corresponding to the controller.

Preferably, the transformer ratio of the high-frequency isolation transformer is N:1.

Preferably, the AC port voltage $v_p$ of the primary side diode clamp mixed three-level full-bridge $H_1$ can generate five voltage levels: $\pm v_{in}$, $$\pm \frac{v_{in}}{2}$$

and 0, where $v_{in}$ is the input DC voltage of the diode clamp mixed three-level dual active full-bridge converter; the AC port voltage $v_s$ of the secondary side single-phase full-bridge $H_2$ can generate three voltage levels: $\pm v_{out}$ and 0, where $v_{out}$ is the output voltage of the diode clamp mixed three-level dual active full-bridge converter; wherein, the duty ratios of $\pm v_{in}$ voltage levels and 0 voltage level are $D_{p1}$ and $D_{p0}$ respectively within one switching cycle of the primary side diode clamp mixed three-level full-bridge $H_1$; the duty ratio of 0 voltage level is $D_{s0}$ within one switching cycle of the secondary side single-phase full-bridge $H_2$, and the relative phase shift of the primary side diode clamp mixed three-level full-bridge $H_1$ and the secondary side single-phase full-bridge $H_2$ is $D_{ss}$.

Preferably, the controller comprises a sampling unit, a PI controller and a modulation unit, wherein the sampling unit contains two signal inputs, and the two signal inputs respectively measure the input voltage $v_{in}$ and the output voltage $v_{out}$ and obtain a voltage transfer ratio M according to the input voltage $v_{in}$, the output voltage $v_{out}$, and the transformer ratio N of the high-frequency isolation transformer;

the PI controller obtains an output x of the PI controller according to the input voltage $v_{in}$ and the output voltage $v_{out}$;

the output through which the switch control signal is output by the modulation unit is respectively connected with the inputs of the control signals of the control signals of the fully controlled switching devices $S_1$~$S_6$ and the fully controlled switching devices $Q_1$~$Q_4$, and obtains the control variable output by the control signal of the control switch according to the output x of the PI controller and voltage transfer ratio M.

The present invention further provides a control method of the above described diode clamp mixed three-level dual active full-bridge converter comprising the following steps:

The input voltage $v_{in}$ and output voltage $v_{out}$ are measured respectively by the sampling unit of the controller, the transformer ratio N of the high-frequency isolation transformer is set, and the voltage transfer ratio M is calculated;

the parameters $k_p$ and $k_i$ of the PI controller of the controller are set, and the output x of the PI controller is calculated;

the voltage transfer ratio M and the output x of the PI controller are respectively output to the modulation unit of the controller, and the phase shift control variable is calculated;

according to the phase shift control variable, the fully controlled switching devices $S_1$~$S_6$ and the fully controlled switching devices $Q_1$~$Q_4$ are driven and the actions of the fully-controlled switching devices are controlled to realize optimal operation.

Preferably, the voltage transfer ratio M is:

$$M = \frac{Nv_{out}}{v_{in}} \tag{1}$$

where the transformer ratio N of the high-frequency isolation transformer is preset as an initial value.

Preferably, the output x of the PI controller is:

$$x = k_p(v_{ref} - v_{out}) + k_i \int (v_{ref} - v_{out}) dt \tag{2}$$

where $0.1 \le k_p \le 10$, $0.001 \le k_i \le 1$, $v_{ref}$ is the reference voltage; the range of the output x of the PI controller is [0, 1.5].

Preferably, there are four phase shift control variables: $D_{p1}$, $D_{p0}$, $D_{s0}$, $D_{s0}$; wherein:

$D_{p1}$ controls the $\pm v_{in}$ voltage levels of the primary side diode clamp mixed three-level full-bridge $H_1$;

$D_{p0}$ controls the 0 voltage level of the primary side diode clamp mixed three-level full-bridge $H_1$;

$D_{s0}$ controls the 0 voltage level of the secondary side single-phase full-bridge $H_2$;

$D_{s0}$ controls the relative phase shift of the primary side diode clamp mixed three-level full-bridge $H_1$ and the secondary side single-phase full-bridge $H_2$.

Preferably, the process of calculating the phase shift control variety includes:

The operating conditions of the converter is divided into three types according to the value of the voltage transfer ratio M, and then the corresponding four phase shifting control variables are calculated according to the value of the PI controller x;

The first case:

$$0 < M < \frac{1}{2}, \text{ i.e., } 2 \times Nv_{out} < v_{in}, \tag{3}$$

when $0 < x < 2M$, the phase shift control variables are calculated as follows:

$$D_{p0} = 1 - x \tag{4}$$
$$D_{p1} = 0$$
$$D_{s0} = 1 - \frac{1 - D_{p0}}{2M}$$
$$D_{ss} = (1 - D_{s0})(1 - 2M)$$

when $2M < x < 1$, the phase shift control variables are calculated as follows:

$$D_{p0} = 1 - x \tag{5}$$
$$D_{s0} = 0$$
$$D_{p1} = 1 - \frac{D_{p0}}{1 - 2M}$$
$$D_{ss} = \frac{D_{p1}(2M^2 - 1) + M(1 - 2M)}{2M} + \frac{\sqrt{(1-2M)^2 M^2 + 2D_{p1}M(1 - 3M + 4M^2 - 4M^3) + D_{p1}^2(1 - 2M + 4M^2 - 4M^3 + 4M^4)}}{2M}$$

when $1 < x < 1.5$, the phase shift control variables are calculated as follows:

$$D_{p0} = 0 \tag{6}$$

-continued $D_{p1} = 1$ $D_{s0} = 0$ $D_{ss} = \frac{1}{2} - \frac{(2x-3)(1-\sqrt{1-M^2})}{2M}$ The second case: ½<M<1, i.e., $\frac{1}{2} < M < 1$, i.e., $\frac{v_{in}}{2} < Nv_{out} < v_{in}$, when 0<x<2M−1, the phase shift control variables are calculated as follows:

$D_{p1} = x$ (7)

$D_{ss} = 0$ $D_{p0} = 1 - \frac{D_{p1}}{(2M-1)}$ $D_{s0} = D_{p0}$ when 2M−1<x<1, the phase shift control variables are calculated as follows:

$D_{p1} = x$ (8)

$D_{p0} = 0$ $D_{s0} = D_{p0}$ $D_{ss} = \frac{-D_{p1} + D_{p1}M + \sqrt{M(D_{p1}+D_{p1}^2-2D_{p1}M)+D_{p1}^2(1-M)^2}}{2M}$ when 1<x<1.5, the phase shift control variables are calculated as follows:

$D_{p0} = 0$ (9)

$D_{p1} = 1$ $D_{s0} = 0$ $D_{ss} = \frac{1}{2} - \frac{(2x-3)(1-\sqrt{1-M^2})}{2M}$ The third case: 1<M, i.e., $v_{in}$<$Nv_{out}$, when $0 < x < \frac{1}{M}$, the phase shift control variables are calculated as follows:

$D_{s0} = 1-x$ $D_{p0} = 1 + MD_{s0} - M$ $D_{ss} = 0$ $D_{p1} = 1 - D_{p0}$ (10)

when $\frac{1}{M} < x < 1$, the phase shift control variables are calculated as follows:

$D_{s0} = 1 - x$ (11)

$D_{p0} = 0$ $D_{p1} = 1$ $D_{ss} = \frac{1 - D_{s0} - M + MD_{s0} + \sqrt{D_{s0}^2 - 1 + M^2(1-D_{s0})^2}}{2}$ when 1<x<1.5, the phase shift control variables are calculated as follows:

$D_{p0} = 0$ (12)

$D_{p1} = 1$ $D_{s0} = 0$ $D_{ss} = \frac{1}{2} - \frac{(2x-3)(1-\sqrt{1-M^2})}{2M}$ Preferably, the modulation unit is set as follows:

the duty ratio of the ±$v_{in}$ voltage level of the primary side diode clamp mixed three-level full-bridge $H_1$ is $D_{p1}$;

the duty ratio of the 0 voltage level of the primary side diode clamp mixed three-level full-bridge $H_1$ is $D_{p0}$;

the duty ratio of the 0 voltage level of the secondary side single-phase full-bridge $H_2$ is $D_{s0}$;

the relative shift ratio between the primary side diode clamp mixed three-level full-bridge $H_1$ and the secondary side single-phase full-bridge $H_2$ is $D_{ss}$.

a driving signal pulse is formed, input in time order and controls the work of the fully controlled switching devices of the primary side diode clamp mixed three-level full-bridge $H_1$ and the secondary side single-phase full-bridge $H_2$ to complete the modulation process.

Compared with the prior art, the present invention is advantageous in that:

1. Compared with the full-bridge three-level scheme and the mixed three-level scheme, the diode clamp mixed three-level dual active full-bridge converter and a control method thereof provided in the present invention can reduce the number of semiconductor devices, reduce the cost, and enhance the reliability of the system.

2. The control objective of the diode clamp mixed three-level dual active full-bridge converter and a control method thereof provided in the present invention is to reduce the RMS value of the current flowing through the isolation transformer of the DAB converter, so as to reduce the system loss and improve the conversion efficiency of power.

3. The diode clamp mixed three-level dual active full-bridge converter and a control method thereof provided in the present invention can realize the globally optimized closed-loop control of the diode clamp mixed three-level DAB converter under the control of four degrees of freedom, automatically realize the minimum operation of the RMS value of transformer current and improve the efficiency of power transfer.

4. The present invention provides the diode clamp mixed three-level dual active full-bridge converter and a control method thereof, based on the four control variables, that is, duty ratio of the 0 voltage level of primary side, the duty ratio of the high voltage level of primary side, and the duty ratio of the 0 voltage level of secondary side of the diode clamp mixed three-level DAB converter, and the phase shift ratio between the primary and secondary side of the diode clamp mixed three-level DAB converter, a globally optimized control method for the diode clamp mixed three-level DAB converter is proposed, by coordinating the four control variables of the converter, the RMS value of the current is reduced, and operating efficiency of the converter is improved. Besides, the closed-loop control of the DAB globally optimized operation is given, which enables the converter to automatically realize globally optimized operation under different operating conditions.

BRIEF DESCRIPTION OF THE DRAWINGS

Other features, objects, and advantages of the present invention will become more apparent by reading and referring to the detailed description of the non-restrictive embodiment in the attached drawings below.

DETAILED DESCRIPTION OF THE INVENTION AND EMBODIMENTS

The embodiment of the present invention is described in detail below. The embodiment is implemented on the premise of the technical proposal of the present invention, and detailed implementing method and specific operation process are given. It should be noted that a number of variations and modifications may be made by those skilled in the art without departing from the spirit and scope of the invention.

Figure 1:
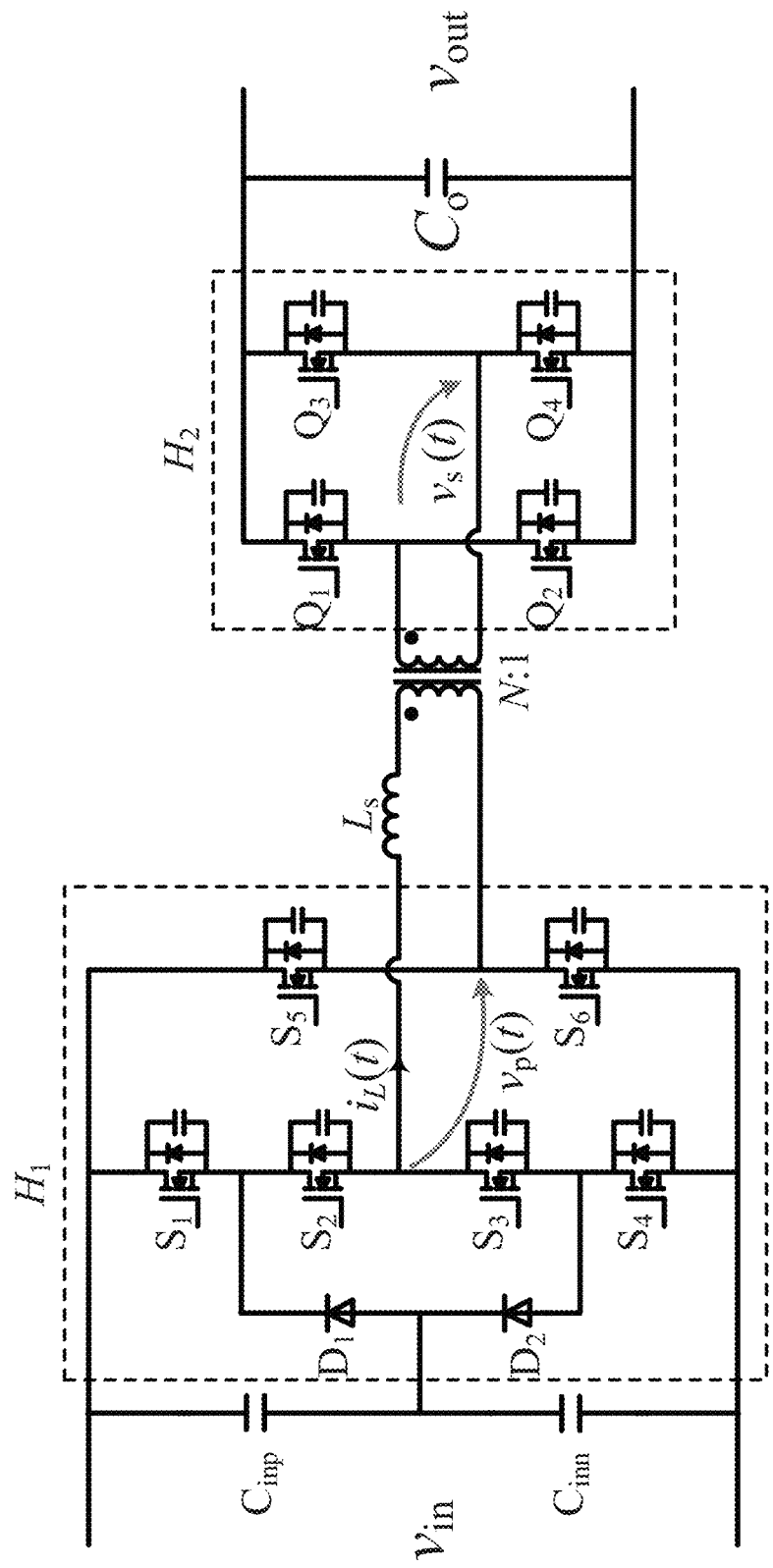
FIG. 1 is a diagram showing the system structure of the diode clamp mixed three-level dual active full-bridge converter of the present invention.

In the embodiment of the present invention, a diode clamp mixed three-level dual active full-bridge converter is provided. As shown in FIG. 1, the topology structure of the diode clamp mixed three-level dual active full-bridge converter comprises input filter capacitors $C_{inp}$ and $C_{inn}$, an output filter capacitor $C_o$, a DC voltage source, a primary side diode clamp mixed three-level full-bridge $H_1$ (referred to as a primary side full bridge), a secondary side single-phase full-bridge $H_2$ (referred to as a secondary side full bridge), a high-frequency isolation transformer, a high-frequency inductor $L_s$, and a controller;

the primary side diode clamp mixed three-level full-bridge $H_1$ is mainly composed of six fully controlled switching devices $S_1$~$S_6$ and two diodes $D_1$ and $D_2$, wherein $S_1$~$S_4$ and diode $D_1$ and $D_2$ form a diode clamp three-level bridge arm, and $S_5$ and $S_6$ form a two-level bridge arm;

the four fully controlled switching devices of the secondary side single-phase full-bridge $H_2$ are $Q_1$~$Q_4$;

the anodes of DC bus of the primary side diode clamp mixed three-level full-bridge $H_1$ are connected with the anode of the corresponding DC voltage source and the anode of the input filter capacitors $C_{inp}$, the cathodes of DC bus of the primary side diode clamp mixed three-level full-bridge $H_1$ are connected with the cathode of the corresponding DC voltage source and the cathode of the input filter capacitors $C_{inn}$, the neutral point of the diode of the primary side diode clamp mixed three-level full-bridge $H_1$ is connected with the midpoint of the series circuit between input filter capacitors $C_{inp}$ and $C_{inn}$;

the AC side of the primary side diode clamp mixed three-level full-bridge $H_1$ is connected with the primary side of the high-frequency isolation transformer through the high-frequency inductor $L_s$;

the anodes of DC bus of the secondary side single-phase full-bridge $H_2$ are connected with the anode of the corresponding DC load and the anode of the output filter capacitor $C_o$, the cathodes of DC bus of the secondary side single-phase full-bridge $H_2$ are connected with the cathode of the corresponding DC load and the cathode of the output filter capacitor $C_o$, the AC side of the secondary side single-phase full-bridge $H_2$ is connected with the primary side of the high-frequency isolation transformer; the transformer ratio of the high-frequency isolation transformer is N:1;

the input of the control signal of the fully controlled switching devices $S_1$~$S_6$ of the primary side diode clamp mixed three-level full-bridge $H_1$ and the input of the control signal of the fully controlled switching device $Q_1$~$Q_4$ of the secondary side single-phase full-bridge $H_2$ are connected with the output of the switching signal corresponding to the controller.

Figure 2:
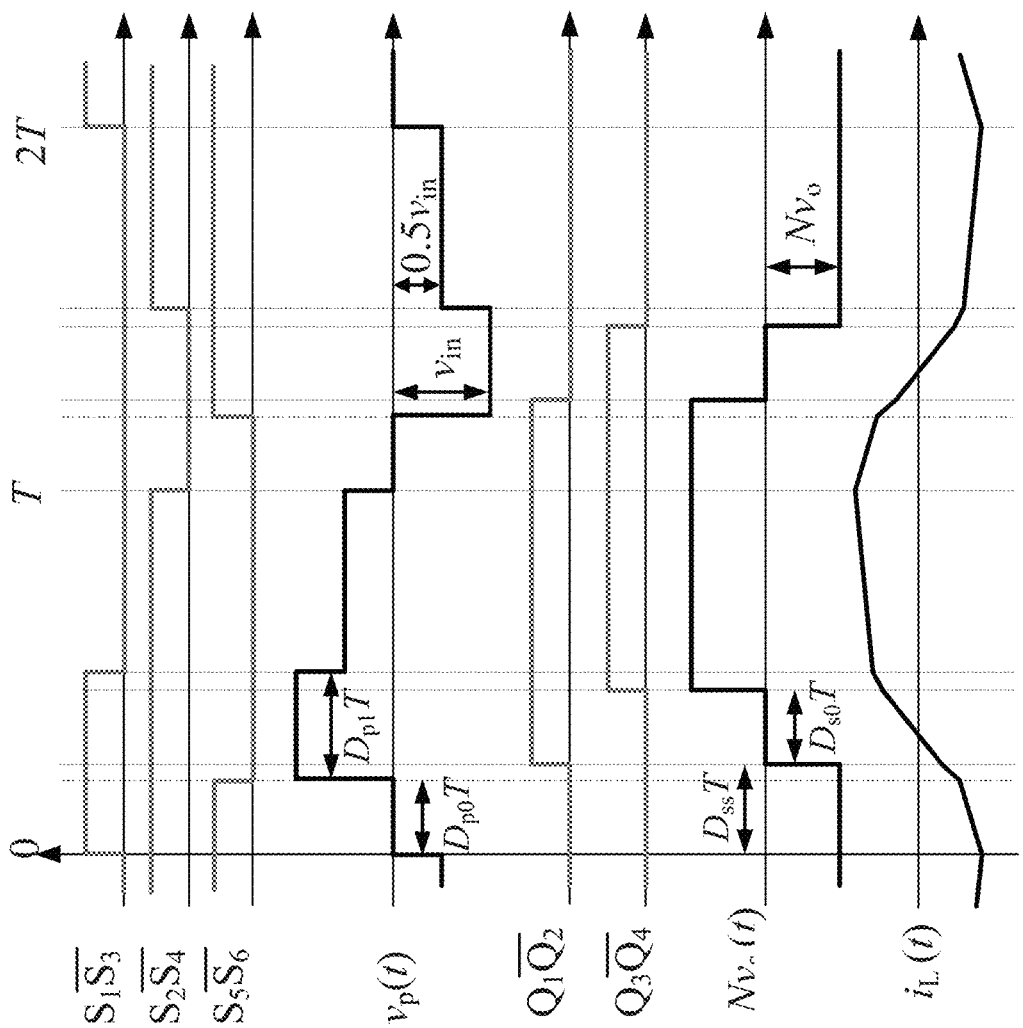
FIG. 2 is a sequence diagram showing the diode clamp mixed three-level dual active full-bridge compensation and the voltage-current waveform diagram of the AC voltage of the primary and secondary side in the present invention.
Figure 3:
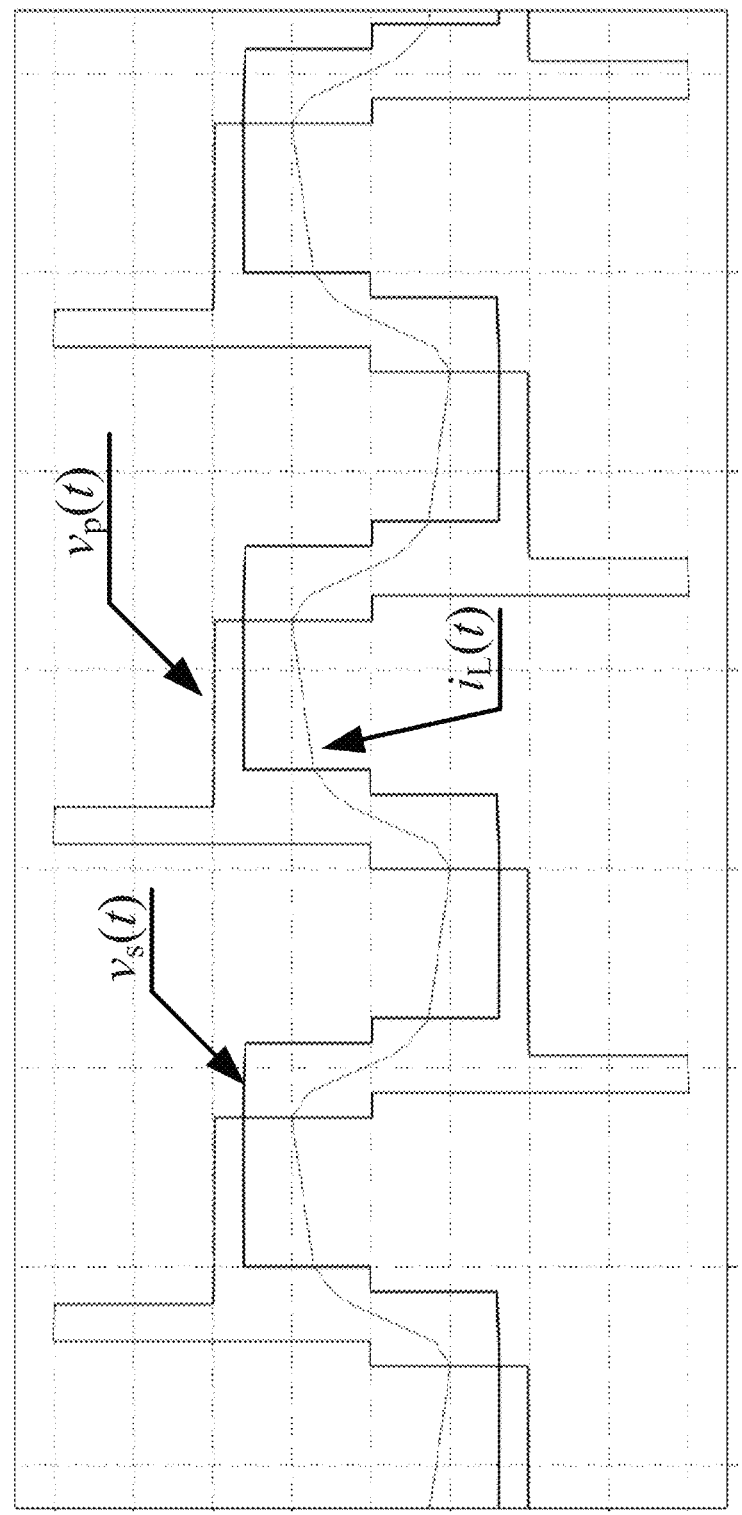
FIG. 3 is a typical voltage-current waveform diagram of the AC voltage of the primary side and secondary side of the mixed three-level dual active full bridge of the present invention.
Figure 4:
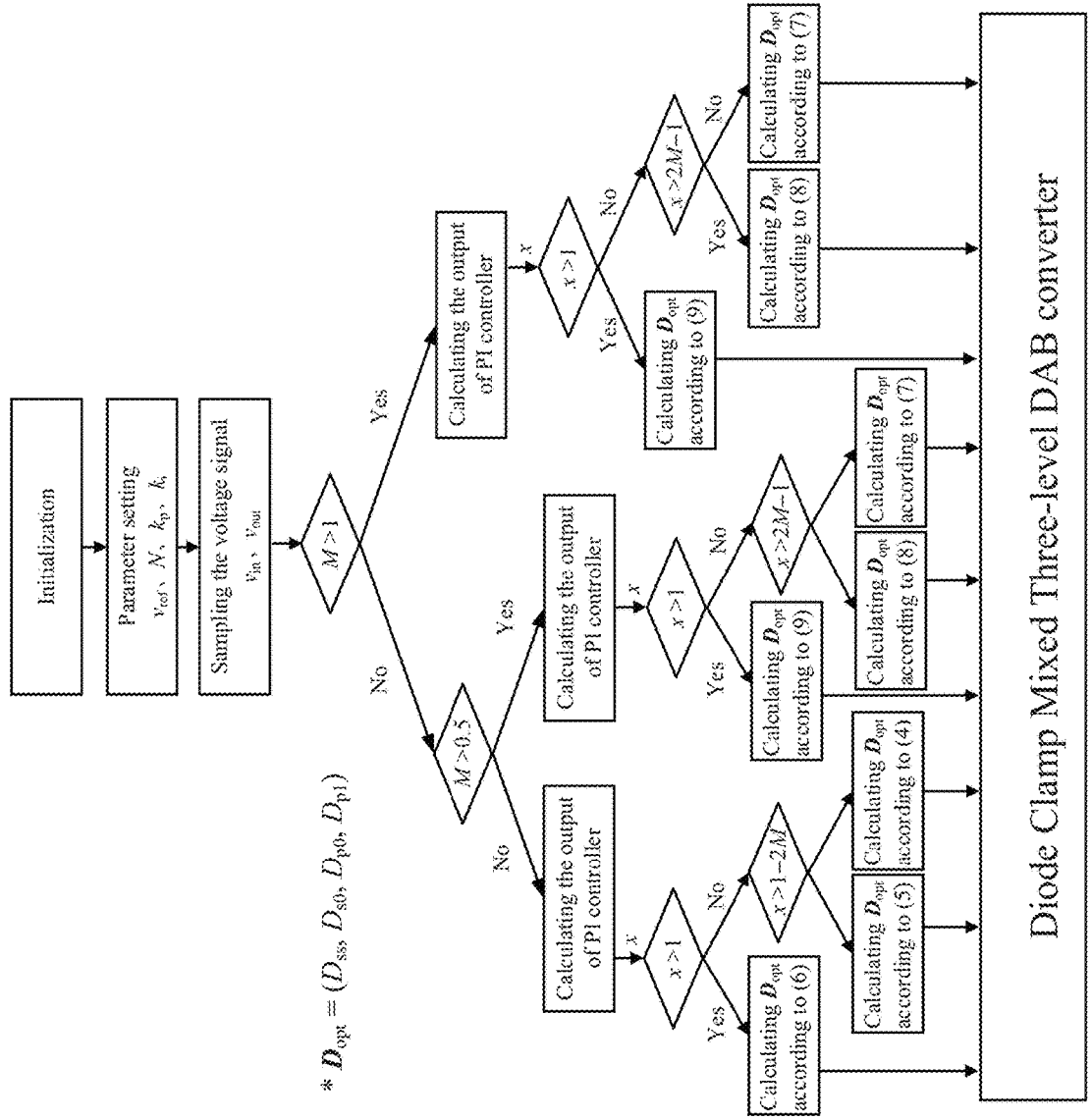
FIG. 4 is a control flow chart of the controller in the present invention.

FIGS. 2 and 3 show the sequence diagram of the diode clamp mixed three-level dual active full-bridge compensation and the typical voltage-current waveform diagram of the AC voltage of the primary side and secondary side of the mixed three-level dual active full bridge in present embodiment. As shown in the figures, the AC port voltage $v_p$ of the primary side full bridge can generate five voltage levels:

$$\pm v_{in}$$

$$\pm \frac{v_{in}}{2}$$

and 0; while the AC port voltage $v_s$ of the secondary side full bridge $H_2$ can only generate three voltage levels: $\pm v_{out}$ and 0.

The duty ratios of $\pm v_{in}$ voltage levels and 0 voltage level are $D_{p1}$ and $D_{p0}$ respectively within one switching cycle of the primary side; the duty ratio of 0 voltage level is $D_{s0}$, and the relative phase shift of the primary and the secondary side is $D_{ss}$.

The four-degree-of-freedom globally optimized control method for the diode clamp mixed three-level dual active full-bridge converter provided in the embodiment is implemented as follows:

measuring the input voltage $v_{in}$ and the output voltage $v_{out}$ of the DAB converter respectively, setting the transformer ratio N of the high-frequency transformer (the transformer ratio N of the transformer is determined by the specific device, and input to the controller by the designer), and the parameters $k_p$ and $k_i$ of the PI controller, the voltage modulation ratio M is calculated according to the voltage modulation ratio controller of equation (1); the difference between the DAB output voltage reference value $V_{ref}$ and the output voltage $V_{out}$ is output is output by the PI controller to obtain x according to equation (2). Then, the obtained x and M are output to the modulation unit of the controller, and four phase shift control variables $D_{p1}$, $D_{p0}$, $D_{s0}$, and $D_{s0}$ are calculated according to equations (3) to (11), and finally the power devices $S_1$~$S_6$ and $Q_1$~$Q_4$ are driven to control the action of the DAB power devices to realize optimized operation.

Specifically, the control method is realized based on the controller. The controller comprises a sampling unit, a PI controller and a modulation unit, wherein the sampling unit has two signal inputs, respectively measuring the input voltage $v_{in}$ and the output voltage $v_{out}$ of the DAB, and obtaining a voltage transfer ratio M according to the input voltage $v_{in}$, the output voltage $v_{out}$, and the transformer ratio N of the high-frequency isolation transformer;

the PI controller obtains an output x of the PI controller according to the input voltage $v_{in}$ and the output voltage $v_{out}$;

the output through which the switch control signal is output by the modulation unit is respectively connected with the inputs of the control signals of the control signals of the fully controlled switching devices $S_1$~$S_6$ and the fully controlled switching devices $Q_1$~$Q_4$ corresponding to the primary and secondary side full bridge of the mixed three-level DAB; the control variable output by the control signal of the control switch is obtained according to the output x of the PI controller and voltage transfer ratio M.

In the embodiment of the present invention, the controller calculates the voltage transfer ratio according to equation (1):

$$M = \frac{Nv_{out}}{v_{in}} \quad (1)$$

wherein $v_{in}$ is the input DC voltage of the mixed three-level DAB, $v_{out}$ is output voltage of the mixed three-level DAB, N is the transformer ratio of the high-frequency isolation transformer, the parameter N is preset as an initial value, and $v_{in}$ and $v_{out}$ are obtained by sampling measurement.

the controller calculates the output x of the PI controller according to equation (2):

$$x = k_p(v_{ref} - v_{out}) + k_i \int (v_{ref} - v_{out}) dt \quad (2)$$

wherein $k_p$ and $k_i$ are the parameters of the PI controller, and preset as $0.1 \leq k_p \leq 10$, $0.001 \leq k_i \leq 1$, $v_{ref}$ is the reference voltage, and the range of output x of the controller is [0, 1.5].

Since the transfer power $P_t$ and the inductive current RMS value $I_{rms}$ of the converter are functions of the control variables $D_{p1}$, $D_{p0}$, $D_{s0}$, and $D_{s0}$, which can be expressed as $P_t$ ($D_{p1}$, $D_{p0}$, $D_{s0}$, $D_{s0}$) and $I_{rms}$ ($D_{p1}$, $D_{p0}$, $D_{s0}$, $D_{s0}$); According to the mathematical principle of optimization method, it can be deduced that the control variable that can minimize $I_{rms}$ under determined transfer power satisfies the following equation:

$$\delta_{Dp1}(D_{p1},D_{p0},D_{ss},D_{s0}) = \delta_{Dp0}(D_{p1},D_{p0},D_{ss},D_{s0}) = \delta_{Dss}(D_{p1},D_{p0},D_{ss},D_{s0}) = \delta_{Ds0}(D_{p1},D_{p0},D_{ss},D_{s0}) \quad (3)$$

wherein $$\delta_{Dp1}(D_{p1}, D_{p0}, D_{ss}, D_{s0}) = \frac{\frac{\partial I_{rms}(D_{p1}, D_{p0}, D_{ss}, D_{s0})}{\partial D_{p1}}}{\frac{\partial P_t(D_{p1}, D_{p0}, D_{ss}, D_{s0})}{\partial D_{p1}}}$$

$$\delta_{Dp0}(D_{p1}, D_{p0}, D_{ss}, D_{s0}) = \frac{\frac{\partial I_{rms}(D_{p1}, D_{p0}, D_{ss}, D_{s0})}{\partial D_{p0}}}{\frac{\partial P_t(D_{p1}, D_{p0}, D_{ss}, D_{s0})}{\partial D_{p0}}}$$

$$\delta_{Dss}(D_{p1}, D_{p0}, D_{ss}, D_{s0}) = \frac{\frac{\partial I_{rms}(D_{p1}, D_{p0}, D_{ss}, D_{s0})}{\partial D_{ss}}}{\frac{\partial P_t(D_{p1}, D_{p0}, D_{ss}, D_{s0})}{\partial D_{ss}}}$$

$$\delta_{Ds0}(D_{p1}, D_{p0}, D_{ss}, D_{s0}) = \frac{\frac{\partial I_{rms}(D_{p1}, D_{p0}, D_{ss}, D_{s0})}{\partial D_{s0}}}{\frac{\partial P_t(D_{p1}, D_{p0}, D_{ss}, D_{s0})}{\partial D_{s0}}}$$

Calculation of four independent control variables of the mixed three-level DAB converter:

Firstly, the operating conditions of the converter is divided into three types according to the value of the voltage transfer ratio M, each condition is analyzed one by one and the corresponding optimized equation (3) is solved, and the constraint relation between each control variable at the optimization operating point of the current RMS value can be obtained, as shown in equation (4)~equation (12). Then, the value of x can be obtained according to equation (2), and the value of the four control variables $D_{p1}$, $D_{p0}$, $D_{s0}$, $D_{s0}$ can be obtained according to equation (4) to equation (12).

a) if $$0 < M < \frac{1}{2}, \text{ i.e., } 2 \times Nv_{out} < v_{in},$$

i. when 0<x<2M, each control variable is calculated according to equation (4):

$$D_{p0} = 1 - x \quad (4)$$
$$D_{p1} = 0$$
$$D_{s0} = 1 - \frac{1 - D_{p0}}{2M}$$
$$D_{ss} = (1 - D_{s0})(1 - 2M)$$

ii. when 2M<x<1, each control variable is calculated according to equation (5):

$$D_{p0} = 1 - x \quad (5)$$
$$D_{s0} = 0$$

-continued $$D_{p1} = 1 - \frac{D_{p0}}{1-2M}$$

$$D_{ss} = \frac{D_{p1}(2M^2-1) + M(1-2M)}{2M} +$$
$$\frac{\sqrt{(1-2M)^2 M^2 + 2D_{p1}M(1-3M+4M^2-4M^3) + D_{p1}^2(1-2M+4M^2-4M^3+4M^4)}}{2M}$$

iii. when 1<x<1.5, each control variable is calculated according to equation (6):

$$D_{p0} = 0 \quad (6)$$
$$D_{p1} = 1$$
$$D_{s0} = 0$$
$$D_{ss} = \frac{1}{2} - \frac{(2x-3)(1-\sqrt{1-M^2})}{2M}$$

b) if $\frac{1}{2} < M < 1$, i.e., $\frac{v_{in}}{2} < Nv_{out} < v_{in}$, i. when 0<x<2M−1, each control variable is calculated according to equation (7):

$$D_{p1} = x \quad (7)$$
$$D_{ss} = 0$$
$$D_{p0} = 1 - \frac{D_{p1}}{(2M-1)}$$
$$D_{s0} = D_{p0}$$

ii. when 2M−1<x<1, each control variable is calculated according to equation (8):

$$D_{p1} = x \quad (8)$$
$$D_{p0} = 0$$
$$D_{s0} = D_{p0}$$
$$D_{ss} = \frac{-D_{p1} + D_{p1}M + \sqrt{M(D_{p1} + D_{p1}^2 - 2D_{p1}M) + D_{p1}^2(1-M)^2}}{2M}$$

iii. when 1<x<1.5, each control variable is calculated according to equation (9):

$$D_{p0} = 0 \quad (9)$$
$$D_{p1} = 1$$
$$D_{s0} = 0$$
$$D_{ss} = \frac{1}{2} - \frac{(2x-3)(1-\sqrt{1-M^2})}{2M}$$

c) if $1 < M$, i.e., $v_{in} < Nv_{out}$, i. when $$0 < x < \frac{1}{M},$$

each control variable is calculated according to equation (10):

$$D_{s0} = 1-x$$
$$D_{p0} = 1 + MD_{s0} - M$$
$$D_{ss} = 0$$
$$D_{p1} = 1 - D_{p0} \quad (10)$$

ii. when $$\frac{1}{M} < x < 1,$$

each control variable is calculated according to equation (11):

$$D_{s0} = 1 - x \quad (11)$$
$$D_{p0} = 0$$
$$D_{p1} = 1$$
$$D_{ss} = \frac{1 - D_{s0} - M + MD_{s0} + \sqrt{D_{s0}^2 - 1 + M^2(1-D_{s0})^2}}{2}$$

iii. when 1<x<1.5, each control variable is calculated according to equation (12):

$$D_{p0} = 0 \quad (12)$$
$$D_{p1} = 1$$
$$D_{s0} = 0$$
$$D_{ss} = \frac{1}{2} - \frac{(2x-3)(1-\sqrt{1-M^2})}{2M}$$

Under the condition that the duty ratio of the ±$v_{in}$ voltage level of the primary side full bridge is $D_{p1}$, the duty ratio of the 0 voltage level of the primary side full bridge is $D_{p0}$, the duty ratio of the 0 voltage level of the secondary side full bridge is $D_{s0}$, and the relative shift ratio between the primary and secondary side is $D_{ss}$, the controller forms a driving signal pulse, inputs it in time order and controls the work of the primary side diode clamp mixed three-level full-bridge $H_1$ and the secondary side single-phase full-bridge $H_2$ to complete the modulation process. The globally optimized closed-loop control of the diode clamp mixed three-level DAB converter under the control of four degrees of freedom can be realized, and the minimum operation of the RMS value of transformer current can be realize automatically to improve the efficiency of power transfer.

Figure 5:
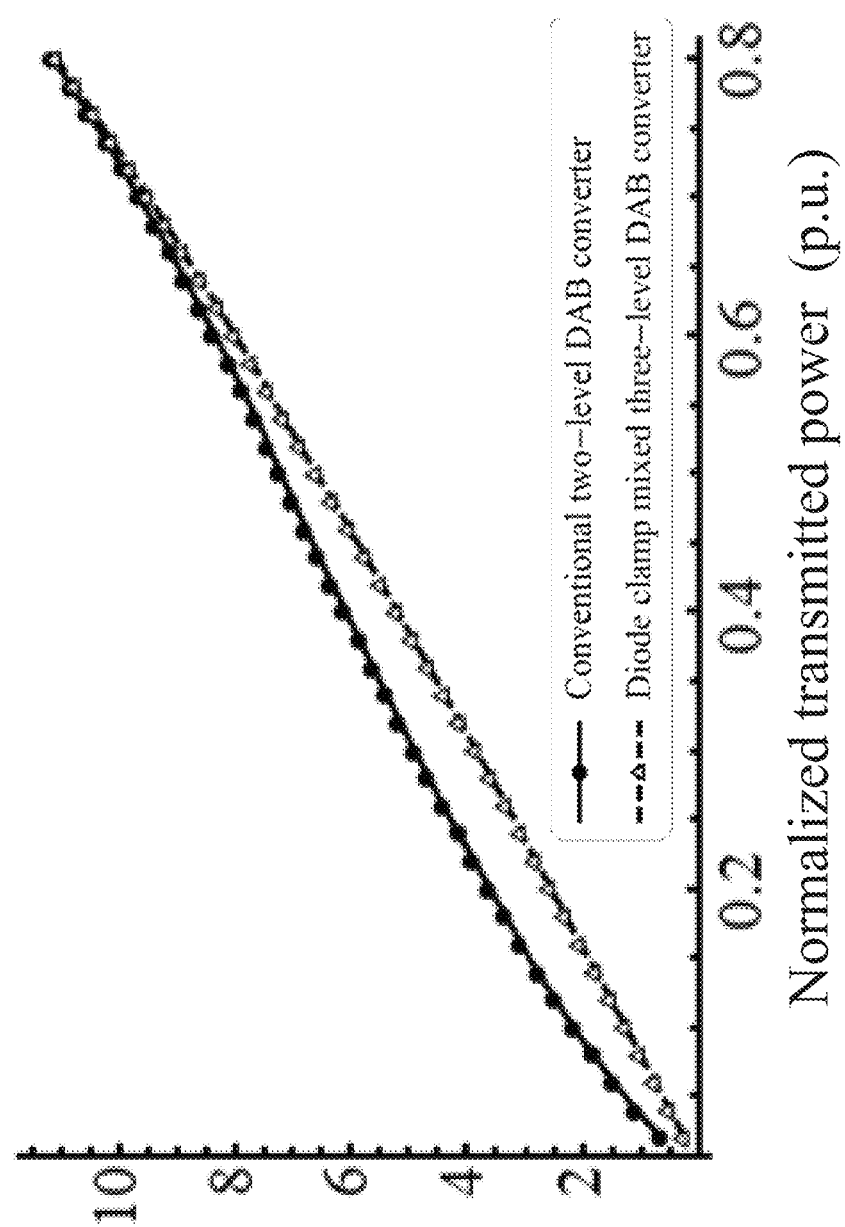
FIG. 5 shows comparison of the RMS values of the current generated by the diode clamp mixed three-level dual active full-bridge converter in the present invention using the control method of the present invention and the current generated by the traditional two-level dual active full-bridge converter under the same parameters; the vertical axis on the left shows the RMS value of transformer current (A).
Figure 6:
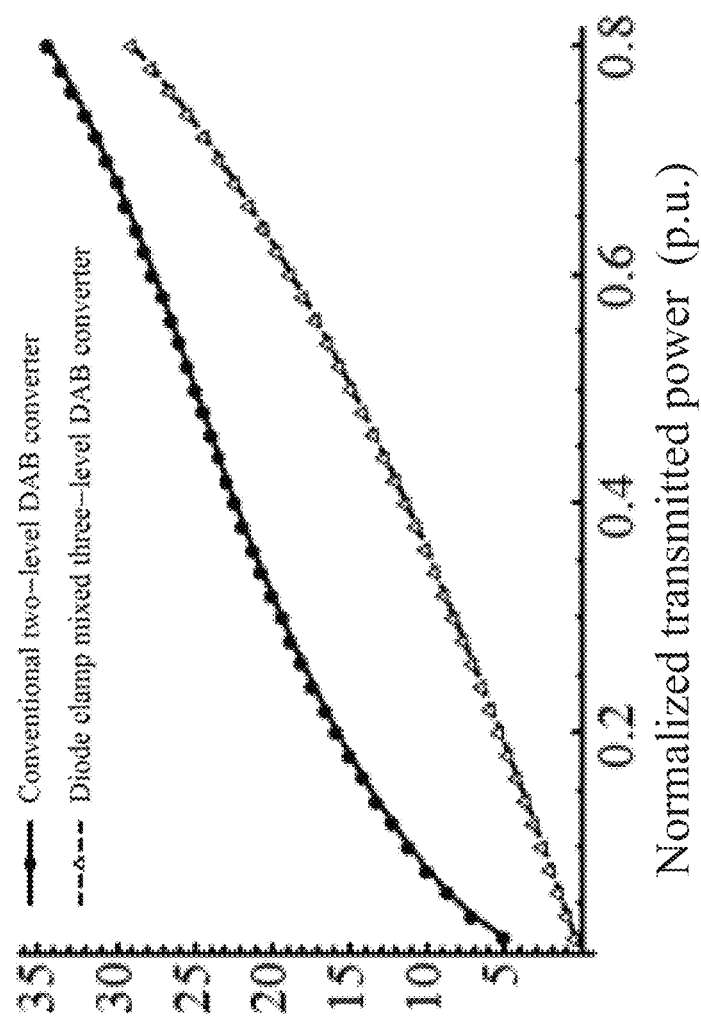
FIG. 6 shows the comparison of the stresses of the current generated by the diode clamp mixed three-level dual active full-bridge converter in the present invention using the control method of the present invention and the current generated by the traditional two-level dual active full-bridge converter under the same parameters; the vertical axis on the left shows the peak value of transformer current (A).

FIG. 5 to FIG. 6 are comparisons of the RMS values of the current and the peak values of the current peak of the diode clamp mixed three-level DAB converter in present embodiment and a traditional two-level DAB converter both using their respective optimization strategies, wherein voltage transfer ratio M=0.5, input voltage $v_{in}$=400V, output voltage $v_{out}$=200V, switching frequency $f_s$=200 kHz, AC inductor $L_s=20$ µH, transformer ratio N=1, output filter capacitor $C_o=100$ µF, input filter capacitor $C_{inp}=40$ µF, $C_{inn}=40$ µF. Since the RMS value of the current is proportional to the converter loss, a decrease in the RMS value of the current means an increase in efficiency. As shown, the diode clamp mixed three-level DAB converter is superior to the traditional two-level DAB converter in the full power range with less loss and current stress. It can be seen that the diode clamp mixed three-level dual active full-bridge converter and the control method thereof provided by the present invention can realize optimized operation of the converter in a wide voltage range.

The diode clamp mixed three-level dual active full-bridge (DAB) converter and the control method thereof provided by the above embodiment of the present invention, based on a traditional two-level DAB (bidirectional active full-bridge) converter, replace the two-level bridge arm on the primary side with a diode clamp three-level bridge arm to add an additional control variable that makes the topology suitable for applications with wide voltage range. Based on the four control variables, that is, duty ratio of the 0 voltage level of primary side, the duty ratio of the high voltage level of primary side, and the duty ratio of the 0 voltage level of secondary side of the diode clamp mixed three-level DAB converter, and the phase shift ratio between the primary and secondary side of the diode clamp mixed three-level DAB converter, four-degree-of-freedom globally optimized control of diode clamp mixed three-level DAB converter is realized, by coordinating the four control variables of the converter, the RMS value of the current is reduced, and operating efficiency of the converter is improved. Besides, the closed-loop control of the DAB globally optimized operation is given, which enables the converter to automatically realize globally optimized operation under different operating conditions.

The specific embodiment of the present invention is described above. It should be understood that the invention is not limited to the above specific implementing way, and various modifications and changes may be made by those skilled in the art without departing from the scope of claims, which do not affect the substance of the invention.

We claim:

1. A diode clamp mixed three-level dual active full-bridge converter, comprising
an input filter capacitor $C_{inp}$ having an anode and an input filter capacitor $C_{inn}$ having a cathode, wherein the input filter capacitor $C_{inp}$ and the input filter capacitor $C_{inn}$ are connected in a series circuit having a midpoint in-between,
an output filter capacitor $C_o$ having an anode and a cathode,
a DC voltage source having an anode and a cathode,
a primary side diode clamp mixed three-level full-bridge $H_1$ having an AC side, a DC bus with anodes and cathodes and a diode with neutral point,
a secondary side single-phase full-bridge $H_2$ having an AC side, and a DC bus with anodes and cathodes,
a high-frequency isolation transformer having a primary side,
a high-frequency inductor $L_s$, and
a controller;
wherein the primary side diode clamp mixed three-level full-bridge $H_1$ further comprises fully controlled switching devices $S_1$, $S_2$, $S_3$, $S_4$, $S_5$, and $S_6$, and diodes $D_1$ and $D_2$;
the fully controlled switching devices $S_1$, $S_2$, $S_3$, and $S_4$ and the diode $D_1$ and $D_2$ form a diode clamp three-level bridge arm, and the fully controlled switching devices $S_5$ and $S_6$ form a two-level bridge arm;
the secondary side single-phase full-bridge $H_2$ comprises fully controlled switching devices $Q_1$, $Q_2$, $Q_3$, and $Q_4$;
the anodes of the DC bus of the primary side diode clamp mixed three-level full-bridge $H_1$ are respectively connected with the anode of the corresponding DC voltage source and the anode of the input filter capacitor $C_{inp}$, the cathodes of the DC bus of the primary side diode clamp mixed three-level full-bridge $H_1$ are respectively connected with the cathode of the corresponding DC voltage source and the cathode of the input filter capacitors $C_{inn}$, the neutral point of the diode of the primary side diode clamp mixed three-level full-bridge $H_1$ is connected with the midpoint of the series circuit between input filter capacitors $C_{inp}$ and $C_{inn}$;
the AC side of the primary side diode clamp mixed three-level full-bridge $H_1$ is connected with the primary side of the high-frequency isolation transformer through the high-frequency inductor $L_s$;
the anodes of the DC bus of the secondary side single-phase full-bridge $H_2$ are respectively connected with an anode of a corresponding DC load and the anode of the output filter capacitor $C_o$, the cathodes of the DC bus of the secondary side single-phase full-bridge $H_2$ are respectively connected with a cathode of the corresponding DC load and the cathode of the output filter capacitor $C_o$, the AC side of the secondary side single-phase full-bridge $H_2$ is connected with the primary side of the high-frequency isolation transformer; and
input of a control signal of the fully controlled switching devices $S_1$, $S_2$, $S_3$, $S_4$, $S_5$, and $S_6$ and input of the control signal of the fully controlled switching devices $Q_1$, $Q_2$, $Q_3$, and $Q_4$ are respectively connected with output of a switching signal corresponding to the controller.

2. The diode clamp mixed three-level dual active full-bridge converter of claim 1, wherein a transformer ratio of the high-frequency isolation transformer is N:1.

3. The diode clamp mixed three-level dual active full-bridge converter of claim 1, wherein an AC port voltage $v_p$ of the primary side diode clamp mixed three-level full-bridge $H_1$ generates five voltage levels: $\pm v_{in}$ $$\pm \frac{v_{in}}{2}$$

and 0, and $v_{in}$ is an input DC voltage of the diode clamp mixed three-level dual active full-bridge converter;
an AC port voltage $v_s$ of the secondary side single-phase full-bridge $H_2$ generates three voltage levels: $\pm v_{out}$ and 0, and $v_{out}$ is an output voltage of the diode clamp mixed three-level dual active full-bridge converter;
a duty ratios of $\pm v_{in}$ voltage levels and 0 voltage level are $D_{p1}$ and $D_{p0}$ respectively within one switching cycle of the primary side diode clamp mixed three-level full-bridge $H_1$;
a duty ratio of 0 voltage level is $D_{s0}$ within one switching cycle of the secondary side single-phase full-bridge $H_2$, and
a relative phase shift of the primary side diode clamp mixed three-level full-bridge $H_1$ and the secondary side single-phase full-bridge $H_2$ is $D_{ss}$.

4. The diode clamp mixed three-level dual active full-bridge converter of claim 3, wherein the controller comprises
a sampling unit,
a PI controller, and
a modulation unit,
wherein the sampling unit comprises two signal inputs, and the two signal inputs respectively measure the input voltage $v_{in}$ and the output voltage $v_{out}$ and obtain a voltage transfer ratio M according to the input voltage $v_{in}$, the output voltage $v_{out}$, and a transformer ratio N of the high-frequency isolation transformer;
the PI controller obtains an output x of the PI controller according to the input voltage $v_{in}$ and the output voltage $v_{out}$;
output through which the switch control signal is output by the modulation unit is respectively connected with the inputs of the control signals of the fully controlled switching devices $S_1$, $S_2$, $S_3$, $S_4$, $S_5$, and $S_6$ and the fully controlled switching devices $Q_1$, $Q_2$, $Q_3$, and $Q_4$, and a control signal of the switching device is obtained according to an output x of the PI controller and voltage transfer ratio M.

5. A control method of the diode clamp mixed three-level dual active full-bridge converter of claim 4, comprising:
measuring the input voltage Vin and output voltage Vout respectively by the sampling unit of the controller, setting the transformer ratio N of the high-frequency isolation transformer, and calculating the voltage transfer ratio M;
setting parameters kp and ki of the PI controller of the controller, and calculating the output x of the PI controller;
outputting the voltage transfer ratio M and the output x of the PI controller to the modulation unit of the controller, and calculating the phase shift control variable; and
according to the phase shift control variable, driving the fully controlled switching devices S1~S6 and the fully controlled switching devices Q1~Q4 and controlling actions of the fully-controlled switching devices to realize optimal operation.

6. The control method of claim 5, wherein the voltage transfer ratio M is:

$$M = \frac{Nv_{out}}{v_{in}}$$

wherein the transformer ratio N of the high-frequency isolation transformer is preset as an initial value.

7. The control method of claim 5, wherein the output x of the PI controller is:

$$x = k_p(v_{ref} - v_{out}) + k_i \int (v_{ref} - v_{out}) dt$$

wherein $0.1 \leq k_p \leq 10$, $0.001 \leq k_i \leq 1$, $v_{ref}$ is the reference voltage; the range of the output x of the PI controller is [0, 1.5].

8. The control method of claim 5, wherein there are four phase shift control variables: $D_{p1}$, $D_{p0}$, $D_{ss}$, $D_{s0}$; wherein $D_{p1}$ controls the $\pm v_{in}$ voltage levels of the primary side diode clamp mixed three-level full-bridge $H_1$;
$D_{p0}$ controls the 0 voltage level of the primary side diode clamp mixed three-level full-bridge $H_1$;
$D_{s0}$ controls the 0 voltage level of the secondary side single-phase full-bridge $H_2$; and
$D_{s0}$ controls the relative phase shift of the primary side diode clamp mixed three-level full-bridge $H_1$ and the secondary side single-phase full-bridge $H_2$.

9. The control method of claim 8, wherein the process of calculating the phase shift control variety includes:
the operating conditions of the converter is divided into three types according to the value of the voltage transfer ratio M, and then the corresponding four phase shifting control variables are calculated according to the value of the PI controller x;
the first case:

$$0 < M < \frac{1}{2}, \text{ i.e., } 2 \times Nv_{out} < v_{in},$$

when 0<x<2M, the phase shift control variables are calculated as follows:

$$D_{p0} = 1 - x \qquad (4)$$
$$D_{p1} = 0$$
$$D_{s0} = 1 - \frac{1 - D_{p0}}{2M}$$
$$D_{ss} = (1 = D_{s0})(1 - 2M)$$

when 2M<x<1, the phase shift control variables are calculated as follows:

$$D_{p0} = 1 - x \qquad (5)$$
$$D_{s0} = 0$$
$$D_{p1} = 1 - \frac{D_{p0}}{1 - 2M}$$

$$D_{ss} = \frac{D_{p1}(2M^2 - 1) + M(1 - 2M)}{2M} + \sqrt{\frac{(1 - 2M)^2 M^2 + 2D_{p1}M \\ (1 - 3M + 4M^2 - 4M^3) + \\ D_{p1}^2(1 - 2M + 4M^2 - 4M^3 + \\ 4M^4)}{2M}}$$

when 1<x<1.5, the phase shift control variables are calculated as follows:

$$D_{p0} = 0 \qquad (6)$$
$$D_{p1} = 1$$
$$D_{s0} = 0$$
$$D_{ss} = \frac{1}{2} - \frac{(2x - 3)(1 - \sqrt{1 - M^2})}{2M}$$

the second case:

$$\frac{1}{2} < M < 1,$$

i.e., $$\frac{v_{in}}{2} < Nv_{out} < v_{in},$$

when $0 < x < 2M-1$, the phase shift control variables are calculated as follows:

$$D_{p1} = x \tag{7}$$

$$D_{ss} = 0$$

$$D_{p0} = 1 - \frac{D_{p1}}{(2M-1)}$$

$$D_{s0} = D_{p0}$$

when $2M-1 < x < 1$, the phase shift control variables are calculated as follows:

$$D_{p1} = x \tag{8}$$

$$D_{p0} = 0$$

$$D_{s0} = D_{p0}$$

$$D_{ss} = \frac{-D_{p1} + D_{p1}M + \sqrt{M(D_{p1} + D_{p1}^2 - 2D_{p1}M) + D_{p1}^2(1-M)^2}}{2M}$$

when $1 < x < 1.5$, the phase shift control variables are calculated as follows:

$$D_{p0} = 0 \tag{9}$$

$$D_{p1} = 1$$

$$D_{s0} = 0$$

$$D_{ss} = \frac{1}{2} - \frac{(2x-3)(1-\sqrt{1-M^2})}{2M}$$

the third case: $1 < M$, i.e., $v_{in} < Nv_{out}$, when $$0 < x < \frac{1}{M},$$

the phase shift control variables are calculated as follows:

$$D_{s0} = 1-x$$

$$D_{p0} = 1 + MD_{s0} - M$$

$$D_{ss} = 0$$

$$D_{p1} = 1 - D_{p0} \tag{10}$$

when $$\frac{1}{M} < x < 1,$$

the phase shift control variables are calculated as follows:

$$D_{s0} = 1 - x \tag{11}$$

$$D_{p0} = 0$$

$$D_{p1} = 1$$

$$D_{ss} = \frac{1 - D_{s0} - M + MD_{s0} + \sqrt{D_{s0}^2 - 1 + M^2(1-D_{s0})^2}}{2}$$

when $1 < x < 1.5$, the phase shift control variables are calculated as follows:

$$D_{p0} = 0 \tag{12}$$

$$D_{p1} = 1$$

$$D_{s0} = 0$$

$$D_{ss} = \frac{1}{2} - \frac{(2x-3)(1-\sqrt{1-M^2})}{2M}.$$

10. The control method of claim 9, wherein the modulation unit is set as follows:
the duty ratio of the $\pm v_{in}$ voltage level of the primary side diode clamp mixed three-level full-bridge $H_1$ is $D_{p1}$;
the duty ratio of the 0 voltage level of the primary side diode clamp mixed three-level full-bridge $H_1$ is $D_{p0}$;
the duty ratio of the 0 voltage level of the secondary side single-phase full-bridge $H_2$ is $D_{s0}$;
the relative shift ratio between the primary side diode clamp mixed three-level full-bridge $H_1$ and the secondary side single-phase full-bridge $H_2$ is $D_{ss}$; and
a driving signal pulse is formed, input in time order and controls the work of the fully controlled switching devices of the primary side diode clamp mixed three-level full-bridge $H_1$ and the secondary side single-phase full-bridge $H_2$ to complete the modulation process.

* * * * *